(12) United States Patent
Nakano

(10) Patent No.: US 6,438,693 B1
(45) Date of Patent: Aug. 20, 2002

(54) MODULAR BROADCAST RECEIVER SYSTEM AND MEMO

(75) Inventor: Takehiko Nakano, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/162,037

(22) Filed: Sep. 28, 1998

(30) Foreign Application Priority Data

Sep. 30, 1997 (JP) ............................................. 09-267552

(51) Int. Cl.⁷ ................................................. G06F 1/26
(52) U.S. Cl. ....................... 713/189; 713/168; 713/184; 380/268
(58) Field of Search ................ 380/FOR 109, 380/268; 713/168, 184, 189

(56) References Cited

U.S. PATENT DOCUMENTS

| 5,699,426 A | | 12/1997 | Tsukamoto et al. ............ 380/21 |
| 5,796,828 A | | 8/1998 | Tsukamoto et al. ............ 380/10 |
| 5,899,578 A | | 5/1999 | Yanagihara et al. .......... 386/75 |
| 5,956,628 A | * | 9/1999 | Owaki ...................... 455/158.4 |
| 5,959,692 A | * | 9/1999 | Nakaya et al. ............... 348/607 |
| 5,999,569 A | * | 12/1999 | Oshima ....................... 375/265 |
| 6,023,295 A | * | 2/2000 | Pau ............................. 348/405 |
| 6,128,352 A | * | 10/2000 | Maeda ........................ 375/316 |

OTHER PUBLICATIONS

"Common Interface Specification for Conditional Access and other Digital Video Broadcasting Decoder Applications", CENELEC, Apr. 1996 Draft D, Apr. 23, 1996.

* cited by examiner

Primary Examiner—Thomas R. Peeso
(74) Attorney, Agent, or Firm—Lerner, David, Littenberg, Krumholz & Mentlik, LLP

(57) ABSTRACT

The construction of a receiving apparatus for receiving a broadcast from a plurality of broadcasting providers is simplified. In a receiving apparatus for receiving a broadcast from a plurality of broadcasting providers, of the function blocks which constitute the receiving apparatus, a block used in common irrespective of the broadcasting provider is formed as a common block, and a block different from one broadcasting provider to another is formed as an independent block. These blocks are connected to each other through an IEEE1394 interface, and the common block is shared among the plurality of blocks which are not used in common, so that a receiving process is performed.

10 Claims, 15 Drawing Sheets

MODULAR BROADCAST RECEIVER SYSTEM AND MEMO

BACKGROUND OF THE INVENTION

1. Field of the Invention

The present invention relates to an information processing apparatus, an information processing method, and a transmission medium and, more particularly, to an information processing apparatus which receives a digital broadcast transmitted from a plurality of broadcasting providers and reproduces this digital broadcast, an information processing method, and a transmission medium.

2. Description of the Related Art

With the advances in image and sound compression technology, etc., digital broadcasts are being realized.

Conventional digital broadcast receiving apparatuses respond to only broadcasting signals from a specific broadcasting provider. Therefore, when a broadcast from a plurality of broadcasting providers is to be received, there is a problem in that a plurality of receiving apparatuses are required, making the financial burden on a user consequently large.

Also, in order to employ a receiving apparatus, an appropriate amount of space is required. Therefore, when a broadcast from a plurality of broadcasting providers is to be received, there is also a problem in finding the necessary space for multiple receiving apparatus.

SUMMARY OF THE INVENTION

An object of the present invention, which has been achieved in view of the above circumstances, is to receive broadcasts from a plurality of broadcasting providers by using a simplified apparatus.

To achieve the above-mentioned object, according to a first aspect of the present invention, there is provided an information processing apparatus comprising: receiving means for receiving broadcasting signals; selection means for selecting signals of a predetermined channel from the broadcasting signals received by the receiving means; demodulation means for demodulating signals of a predetermined channel selected by the selection means into a data stream composed of a plurality of information; and output means for outputting the data stream demodulated by the demodulation means to an external apparatus through an interface.

According to a second aspect of the present invention, there is provided an information processing method comprising: a receiving step of receiving broadcasting signals; a selection step of selecting signals of a predetermined channel from the broadcasting signals received in the receiving step; a demodulation step of demodulating signals of a predetermined channel selected in the selection step into a data stream composed of a plurality of information; and an output step of outputting the data stream demodulated in the demodulation step to an external apparatus through an interface.

According to a third aspect of the present invention, there is provided a transmission medium which transmits a computer program comprising: a receiving step of receiving broadcasting signals; a selection step of selecting signals of a predetermined channel from the broadcasting signals received in the receiving step; a demodulation step of demodulating signals of a predetermined channel selected in the selection step into a data stream formed of a plurality of information; and an output step of outputting the data stream demodulated in the demodulation step to an external apparatus through an interface.

According to a fourth aspect of the present invention, there is provided an information processing apparatus comprising: input means for inputting a data stream processed by an external apparatus through an interface; separation means for separating a plurality of information contained in the data stream input by the input means; decoding means for decoding each of the plurality of information separated by the separation means; and output means for outputting the plurality of information decoded by the decoding means to a corresponding reproduction apparatus.

According to a fifth aspect of the present invention, there is provided an information processing method comprising: an input step of inputting a data stream processed by an external apparatus through an interface; a separation step of separating a plurality of information contained in the data stream input in the input step; a decoding step of decoding each of the plurality of information separated in the separation step; and an output step of outputting the plurality of information decoded in the decoding step to a corresponding reproduction apparatus.

According to a sixth aspect of the present invention, there is provided a transmission medium which transmits a computer program comprising: an input step of inputting a data stream processed by an external apparatus through an interface; a separation step of separating a plurality of information contained in the data stream input in the input step; a decoding step of decoding each of the plurality of information separated in the separation step; and an output step of outputting the plurality of information decoded in the decoding step to a corresponding reproduction apparatus.

According to a seventh aspect of the present invention, there is provided an information processing apparatus comprising: input means for inputting a data stream processed by an external apparatus through an interface; descrambling means for descrambling the data stream input by the input means; and output means for outputting the data stream descrambled by the descrambling means to an external apparatus through an interface.

According to an eighth aspect of the present invention, there is provided an information processing method comprising: an input step of inputting a data stream processed by an external apparatus through an interface; a descrambling step of descrambling the data stream input in the input step; and an output step of outputting the data stream descrambled in the descrambling step to an external apparatus through an interface.

According to a ninth aspect of the present invention, there is provided an transmission medium comprising a computer program comprising: an input step of inputting a data stream processed by an external apparatus through an interface; a descrambling step of descrambling the data stream input in the input step; and an output step of outputting the data stream descrambled in the descrambling step to an external apparatus through an interface.

According to a tenth aspect of the present invention, there is provided an information processing apparatus comprising: input means for inputting, through an interface, a data stream on which a predetermined process is performed by an external apparatus and then an encryption process is performed; decoding means for decoding the encrypted data stream which has been input by the input means; and storage means for storing the data stream decoded by the decoding means.

According to an eleventh aspect of the present invention, there is provided an information processing method comprising: an input step of inputting, through an interface, a data stream on which a predetermined process is performed by an external apparatus and then an encryption process is performed; a decoding step of decoding the encrypted data stream which has been input in the input step; and a storing step of storing the data stream decoded in the decoding step.

According to a twelfth aspect of the present invention, there is provided a transmission medium which transmits a computer program comprising: an input step of inputting, through an interface, a data stream on which a predetermined process is performed by an external apparatus and then an encryption process is performed; a decoding step of decoding the encrypted data stream which has been input in the input step; and a storing step of storing the data stream decoded in the decoding step.

In the information processing apparatus in accordance with the first aspect of the present invention, the information processing method in accordance with the second aspect of the present invention, and the transmission medium in accordance with the third aspect of the present invention, broadcasting signals are received, the signal of a predetermined channel is selected from the received broadcasting signals, the selected signal of the predetermined channel is demodulated into a data stream composed of a plurality of information, and the demodulated data stream is output to an external apparatus through an interface. For example, broadcasting signals are received by an antenna, the signal of a predetermined channel is selected from the received broadcasting signals, the selected signal of the predetermined channel is demodulated into a data stream composed of a plurality of information, such as sound and images, and the demodulated data stream is output to an external apparatus through an interface.

In the information processing apparatus in accordance with the fourth aspect of the present invention, the information processing method in accordance with the fifth aspect of the present invention, and the transmission medium in accordance with the sixth aspect of the present invention, a data stream processed by an external apparatus is input through an interface, a plurality of information contained in the input data stream is separated, each of the plurality of separated information is decoded, and the plurality of decoded information is output to a corresponding reproduction apparatus. For example, a data stream processed by an external apparatus is input through an IEEE1394 interface, the plurality of information, such as sound and images, contained in the input data stream is separated, each of the plurality of separated information is decoded, and the plurality of decoded information is output to a corresponding reproduction apparatus.

In the information processing apparatus in accordance with the seventh aspect of the present invention, the information processing method in accordance with the eighth aspect of the present invention, and the transmission medium in accordance with the ninth aspect of the present invention, a data stream processed by an external apparatus is input through an interface, the input data stream is descrambled, and the descrambled data stream is output to an external apparatus through an interface. For example, a data stream processed by an external apparatus is input through an IEEE1394 interface, the input data stream is descrambled, and the descrambled data stream is output to an external apparatus through the IEEE1394 interface.

In the information processing apparatus in accordance with the tenth aspect of the present invention, the information processing method in accordance with the eleventh aspect of the present invention, and the transmission medium in accordance with the twelfth aspect of the present invention, a data stream on which a predetermined process is performed by an external apparatus and then an encryption process is performed is input through an interface, the input encrypted data stream is decoded, and the decoded data stream is stored. A data stream on which a predetermined process is performed by an external apparatus and then an encryption process is performed is input through an IEEE1394 interface, the input encrypted data stream is decoded, and the decoded data stream is stored in a memory.

The above and further objects, aspects and novel features of the invention will become more apparent from the following detailed description when read in connection with the accompanying drawings.

BRIEF DESCRIPTION OF THE DRAWINGS

FIG. 6 is a block diagram showing an example of the construction of a CI-STB 1a.

DESCRIPTION OF THE PREFERRED EMBODIMENTS

Figure 1:
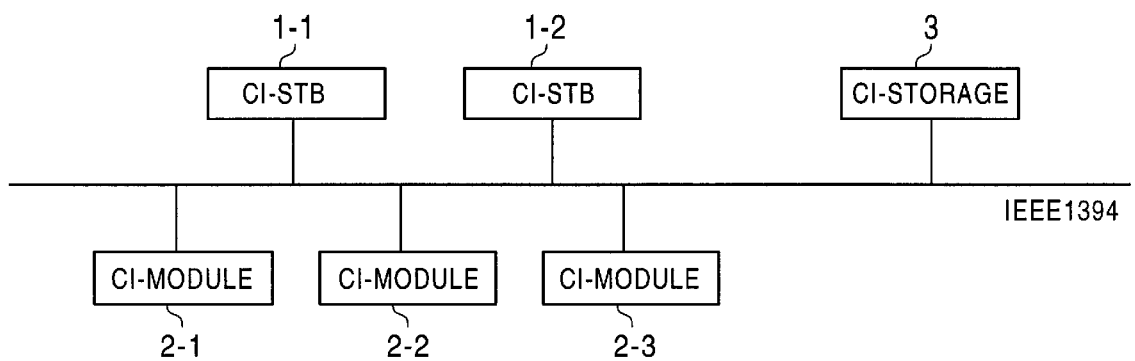
FIG. 1 is a block diagram showing an example of the construction of an embodiment of the present invention.

FIG. 1 is a block diagram showing an example of the construction of an embodiment of an information processing apparatus of the present invention.

In this figure, CI-STBs 1-1 and 1-2 receive a broadcasting signal from a broadcasting provider, demodulate it, and then output the demodulated data stream via an IEEE1394 interface. The demodulated data stream is subjected to a predetermined process by CI-Modules 2-1 to 2-3, and is input to the CI-STBs 1-1 and 1-2 again, whereby the plurality of information contained in the data stream is separated and then the obtained information is reproduced, respectively.

The CI-Modules 2-1 to 2-3 perform a descrambling process on the data stream output from the CI-STBs 1-1 and 1-2, and output the obtained stream via the IEEE1394 interface.

Since this descrambling process is unique to each broadcasting provider, each of the CI-Modules 2-1 to 2-3 performs a descrambling process on a data stream from a predetermined broadcasting provider.

A CI-Storage 3 records a data stream output from the CI-STBs 1-1 and 1-2 or the CI-Modules 2-1 to 2-3.

Figure 2:
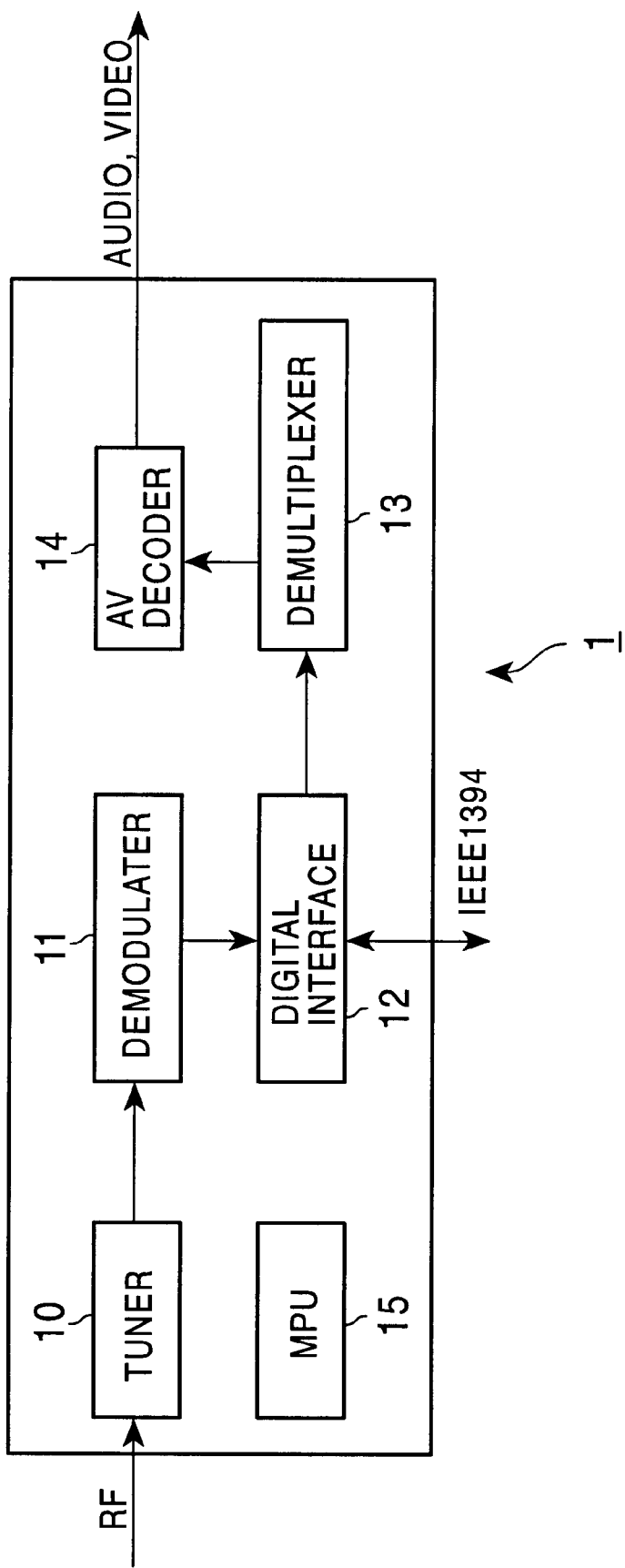
FIG. 2 is a block diagram showing a detailed example of the construction of a CI-STB 1 shown in FIG. 1.

FIG. 2 is a block diagram showing a detailed example of the construction of the CI-STB 1 shown in FIG. 1.

In this figure, a tuner 10 receives an RF (radio frequency) signal from a broadcasting provider and extracts a signal of a predetermined frequency. A demodulator 11 demodulates the signal of the predetermined frequency extracted by the tuner 10 so as to be converted into a data stream.

A digital interface 12, which is an interface that complies with the IEEE1394 standard, outputs a data stream demodulated by the demodulator 11 to an external apparatus and inputs a data stream from an external apparatus.

A demultiplexer 13 separates a plurality of information which forms a data stream (a data stream on which a descrambling process has been performed) input from the external apparatus through the digital interface 12, and supplies it to an AV (Audio Video) decoder 14.

The AV decoder 14 decodes each of the plurality of information separated by the demultiplexer 13. More specifically, the AV decoder 14 decodes, for example, each of the sound information and the image information separated by the demultiplexer 13, and outputs the obtained sound signals and image signals.

An MPU (Microprocessor Unit) 15 controls each section of the apparatus and performs predetermined computation processes as required.

Figure 3:
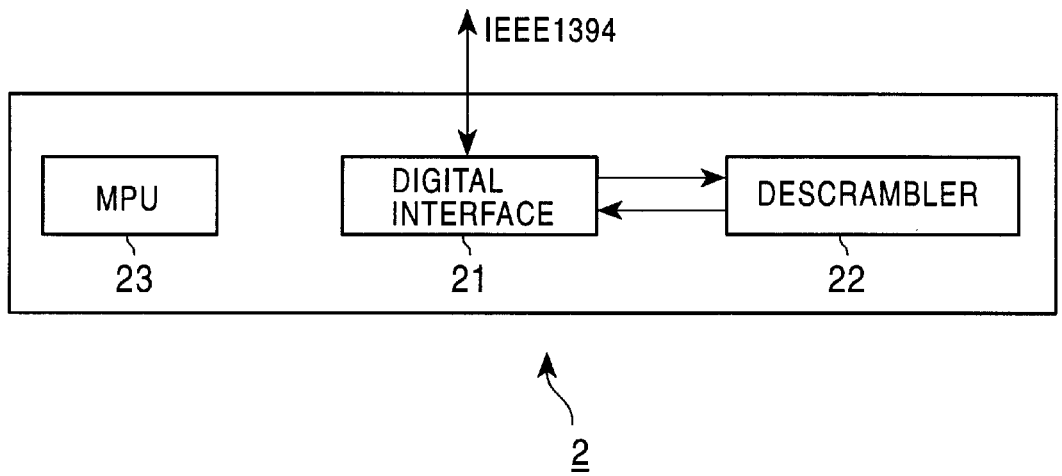
FIG. 3 is a block diagram showing a detailed example of the construction of a CI-Module 2 shown in FIG. 1.

FIG. 3 is a block diagram showing a detailed example of the construction of the CI-Modules 2-1 to 2-3 shown in FIG. 1.

In this figure, a digital interface 21, which is an interface that complies with the IEEE1394 standard, inputs a data stream output from the CI-STBs 1-1 and 1-2 and outputs a data stream on which a descrambling process has been performed by a descrambler 22.

An MPU 23 controls each section of the apparatus, and performs various computations as required.

Figure 4:
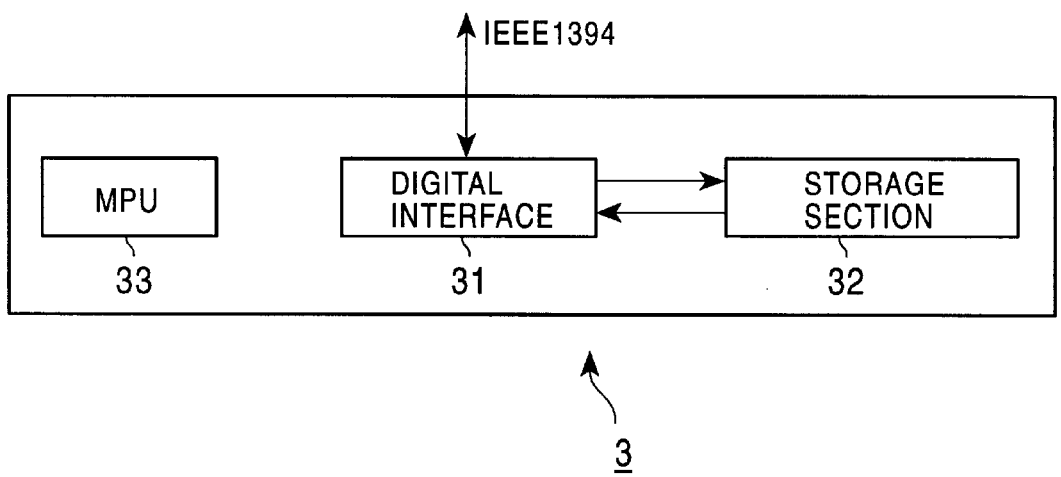
FIG. 4 is a block diagram showing a detailed example of the construction of a CI-Storage 3 shown in FIG. 1.

FIG. 4 is a block diagram showing a detailed example of the construction of the CI-Storage 3 shown in FIG. 1.

In this figure, a digital interface 31 is an interface that complies with the IEEE1394 standard in the same manner as in the above-described case.

A storage section 32, formed of a semiconductor memory and a magnetic recording medium, stores a data stream output from the digital interface 31, and reads a stored data stream and outputs it to the digital interface 31, under the control of an MPU 33.

The MPU 33 controls each section of the apparatus and performs predetermined computations as required.

Next, the operation of the above embodiment is described.

It is assumed that a broadcasting signal (RF signal) from a particular broadcasting provider A is received by the tuner 10 of the CI-STB 1-1. The tuner 10 extracts a signal of a predetermined frequency from the broadcasting signal and outputs it to the demodulator 11.

The demodulator 11 performs a demodulation process on the broadcasting signal of the predetermined frequency extracted by the tuner 10 and outputs the obtained data stream to the digital interface 12.

The digital interface 12 outputs the data stream supplied from the demodulator 11 as a sequence of packets that comply with the IEEE1394 standard. At this time, the data stream is transmitted in an Isochronous transfer mode suitable for real-time reproduction of images, sound, etc.

The communications among the MPUs of respective apparatus through the IEEE1394 are performed by asynchronous transfer.

The data stream output from the CI-STB 1-1 is supplied, for example, to the CI-Module 2-1.

The digital interface 21 of the CI-Module 2-1 inputs the data stream output from the CI-STB 1-1 and supplies it to the descrambler 22. The descrambler 22 performs a descrambling process on the data stream supplied from the digital interface 21. As a result, the scrambling, which has been performed on the data stream by the broadcasting provider in order to prohibit viewing by someone other than a subscriber, is descrambled.

The output of the descrambler 22 is supplied to the digital interface 21 again. As a result, the digital interface 21 outputs the output of the descrambler 22 as a sequence of packets that comply with the IEEE1394 standard.

The sequence of packets output from the CI-Module 2-1 are received by the CI-STB 1-1 again.

The digital interface 12 of the CI-STB 1-1 receives the sequence of packets sent from the CI-Module 2-1 and supplies them to the demultiplexer 13.

The demultiplexer 13 separates the plurality of information contained in the data stream output from the digital interface 12. For example, in the case where this data stream is composed of sound data and image data, the demultiplexer 13 separates the data stream into the sound data and the image data and supplies this data to the AV decoder 14.

The AV decoder 14 decodes the information separated by the demultiplexer 13 and outputs it. For example, in the case where the data stream is composed of sound data and image data, the AV decoder 14 performs a decompression process on each of the sound data and the image data and outputs the obtained sound signals and image signals.

In the case where predetermined control information is supplied from the MPU 15 or the MPU 23 to the CI-Storage 3 through the IEEE1394 interface, the CI-Storage 3 records the data stream transmitted between the CI-STB 1-1 and the CI-Module 2-1. More specifically, the MPU 33 receiving a control command instructing that the data stream is to be recorded controls the digital interface 31 so that the received data stream is supplied to the storage section 32. As a result, the data stream is stored in the storage section 32.

It is also possible to supply the data stream stored in the storage section 32 in this manner to the CI-STB 1-1 and the CI-Module 2-1 and to reproduce it.

In the above, a case is described in which a broadcasting signal from the broadcasting provider A is received. In the case where a broadcasting signal from a broadcasting provider B is received and a descrambling process corresponding to the broadcasting provider B is performed by the CI-Module 2-2, for example, a data stream received by the CI-STB 1-1 is subjected to a descrambling process by the CI-Module 2-2, and then is supplied to the CI-STB 1-1 again, whereby the data stream is decoded into the original sound signals and image signals.

Also, if it is assumed that the CI-Module 2-3 corresponds to a broadcasting provider C, while the CI-STB 1-1 is receiving the broadcast of the broadcasting provider A by using the CI-Module 2-1, the CI-STB 1-2 is able to receive a broadcast of the broadcasting provider B or the broadcasting provider C by using the CI-Module 2-2 or the CI-Module 2-3. Furthermore, it is also possible for the CI-STB 1-1 and the CI-STB 1-2 to receive the data stream which is being output by the CI-Module 2-1 at the same time.

In the manner described above, since the portions formed of the same components are formed into CI-STBs 1-1 and 1-2 irrespective of the broadcasting provider and the descrambler 22 requiring a process unique to each broadcasting provider is formed into independent components as CI-Modules 2-1 to 2-3, in a case in which broadcasting signals from a plurality of broadcasting providers are received, a common function block can be shared, making it possible to view many broadcasts at a low cost.

Figure 5:
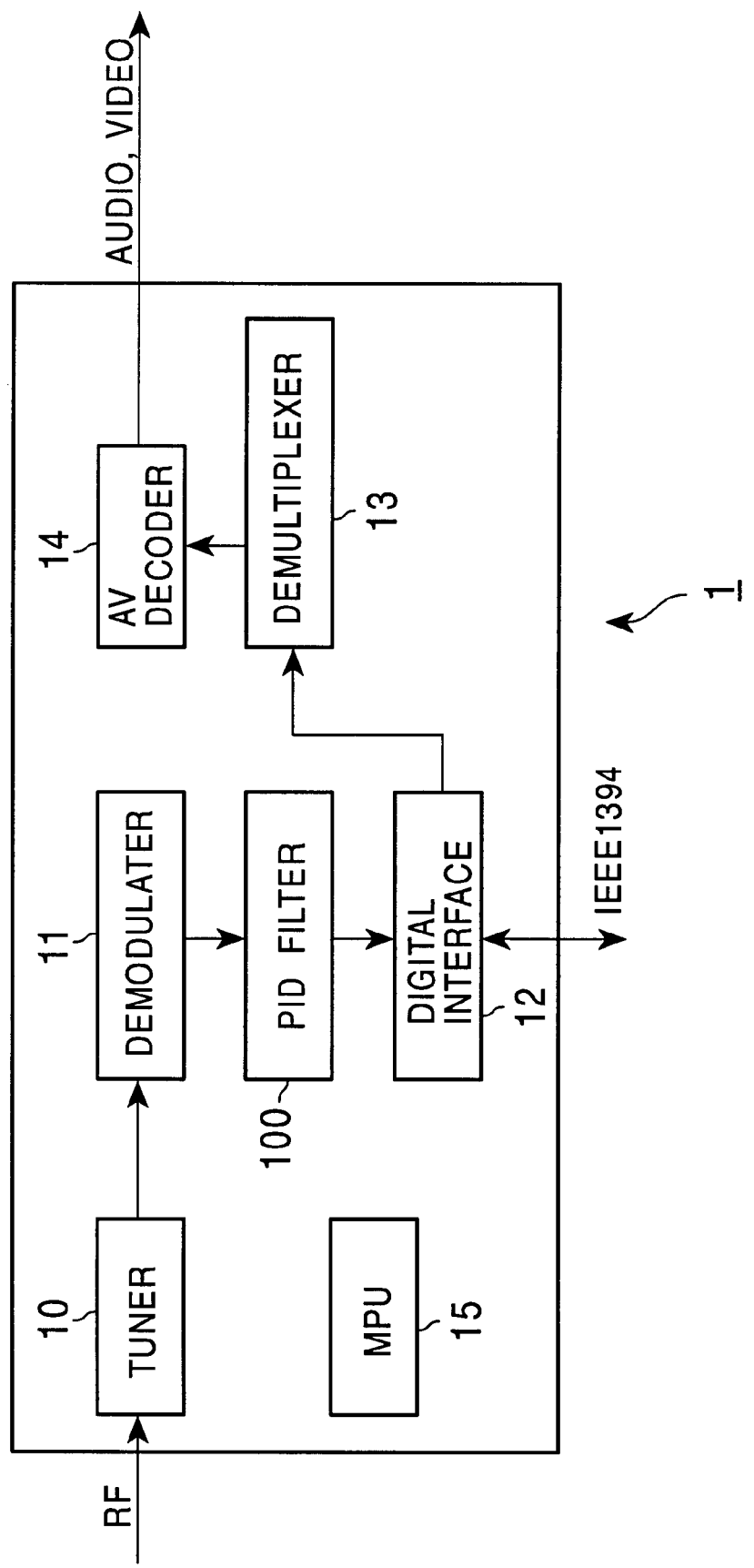
FIG. 5 is a block diagram showing another example of the construction of the CI-STB 1.

FIG. 5 is a block diagram showing another example of the construction of the CI-STBs 1-1 and 1-2 shown in FIG. 1. Components in FIG. 5 which correspond to those of FIG. 2 are given the same reference numeral, and accordingly, a description thereof has been omitted.

In the embodiment of FIG. 5, in comparison with the case of FIG. 2, a PID (Packet ID) filter 100 is newly added. The remaining construction is the same as in the case of FIG. 2.

The PID filter 100 extracts only a predetermined program from the data stream output from the demodulator 11 and supplies it to the digital interface 12.

Next, the operation of the above embodiment is described.

In the case where the sound data and the image data which form the broadcast received by the tuner 10 have been compressed in accordance with MPEG (Moving Picture Experts Group), there is a case in which a plurality of programs have been multiplexed on one data stream.

In the case where such a broadcasting signal is received, the PID filter 100 extracts only the packet for the desired program from the transport stream output from the demodulator 11 by referring to a PID (Packet ID of MPEG) and then supplies the packet to the digital interface 12. As a result, since only the packet for the desired program is sent out from the digital interface 12, for example, the amount of processing in the CI-Modules 2-1 to 2-3 is reduced, and in the case where the data stream is stored in the CI-Storage 3, it is possible to reduce the required storage capacity.

Although, in the above embodiment, the CI-STBs 1-1 and 1-2 include the PID filter 100, it is possible for the CI-Modules 2-1 to 2-3 to include it. Also, with such a construction, it is possible to reduce the amount of data transmitted over the IEEE1394 bus.

Figure 6:
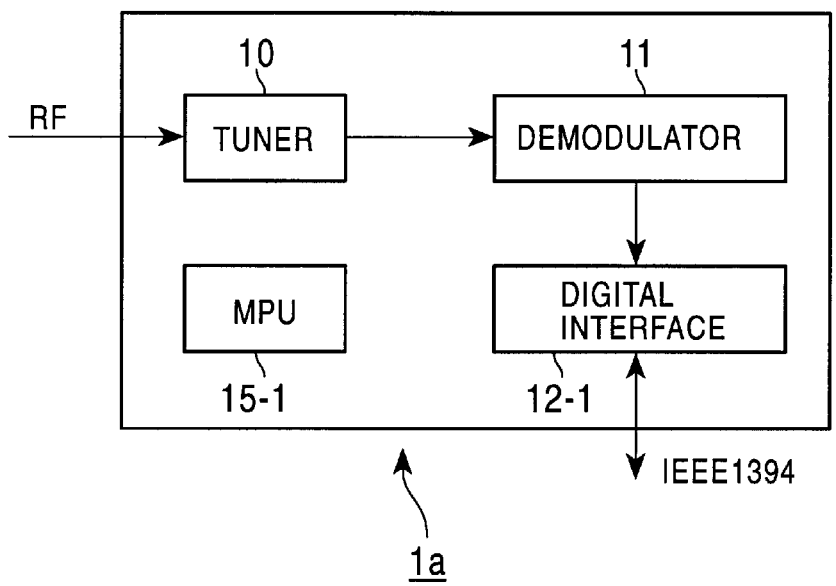
Figure 7:
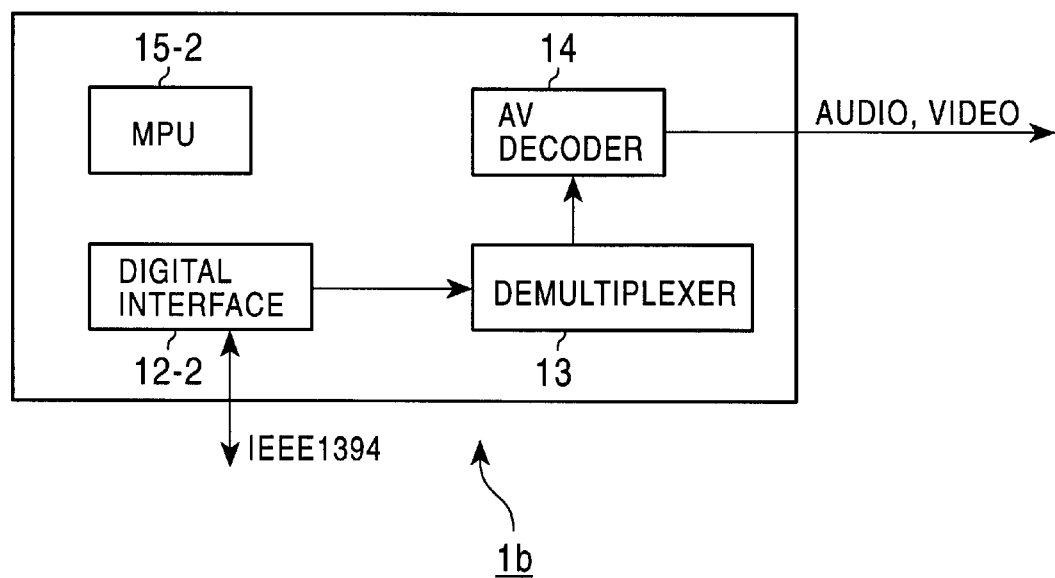
FIG. 7 is a block diagram showing an example of the construction of a CI-Post_STB 1b.

FIGS. 6 and 7 are block diagrams showing another example of the construction of the CI-STBs 1-1 and 1-2 shown in FIG. 1. Components in FIGS. 6 and 7 which correspond to those of FIG. 2 are given the same reference numeral, and accordingly, a description thereof has been omitted.

In the embodiment of FIGS. 6 and 7, the CI-STBs 1-1 and 1-2 shown in FIG. 2 are divided into two portions. More specifically, the CI-STBs 1-1 and 1-2 shown in FIG. 2 are divided into the portion shown in FIG. 6, CI-Pre_STB 1a, including the tuner 10 and the demodulator 11 and the portion shown in FIG. 7, CI-Post_STB 1b, including the demultiplexer 13 and the AV decoder 14. The respective portions include MPUs 15-1 and 15-2 required for control and digital interfaces 12-1 and 12-2 required for exchanging data.

Next, the operation of the above embodiment is described.

The broadcasting signal (RF signal) from the broadcasting provider A received by the tuner 10 is received by the tuner 10 of the CI-Pre_STB 1a. The tuner 10 extracts a signal of a predetermined frequency from the broadcasting signal and outputs it to the demodulator 11.

The demodulator 11 performs a demodulation process on the broadcasting signal of the predetermined frequency extracted by the tuner 10 and outputs the obtained data stream to the digital interface 12-1.

The digital interface 12-1 outputs the data stream supplied from the demodulator 11 as a sequence of packets that comply with the IEEE1394 standard.

The data stream output from the digital interface 12-1 is supplied, for example, to the CI-Module 2-1 whereby it is subjected to a descrambling process and is sent out to the IEEE1394 bus again.

The sequence of packets output from the CI-Module 2-1 are received by the digital interface 12-2 of the CI-Post_STB 1b. The digital interface 12-2 receives the sequence of packets sent out from the CI-Module 2-1 and supplies them to the demultiplexer 13.

The demultiplexer 13 separates a plurality of information contained in the data stream output from the digital interface 12-2 and supplies it to the AV decoder 14. The AV decoder 14 decodes the information separated by the demultiplexer 13 and outputs the original image and sound signals.

According to the above embodiment, in the case where a CI-STB is added, only the portion having the required functions can be added, and therefore, an unwanted expense can be prevented.

Figure 8:
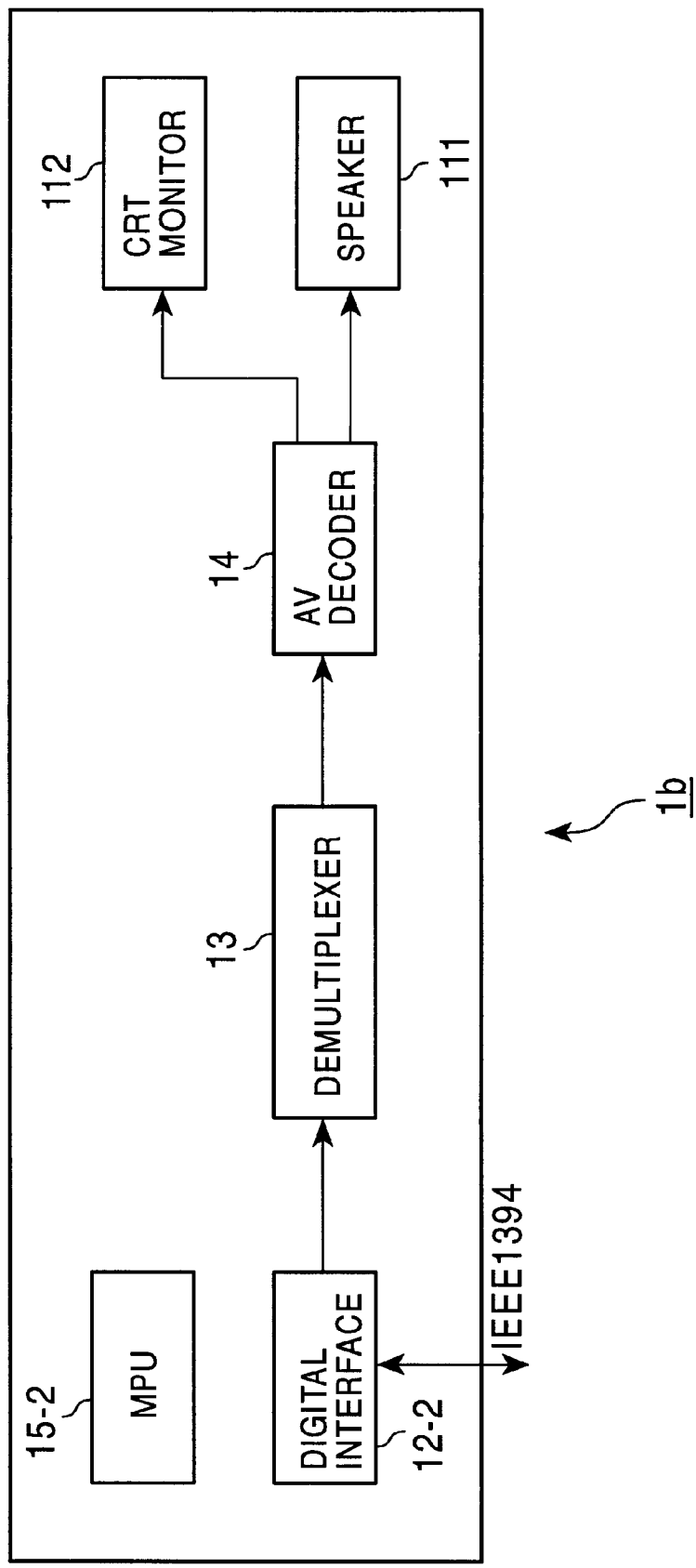
FIG. 8 is a block diagram showing another example of the construction of the CI-Post_STB 1b.

FIG. 8 is a block diagram showing another example of the construction of the CI-Post_STB 1b shown in FIG. 7. Components in FIG. 8 which correspond to those of FIG. 7 are given the same reference numeral, and accordingly, a description thereof has been omitted.

In the embodiment of FIG. 8, in comparison with the case of FIG. 7, a speaker 111 and a CRT monitor 112 are added. The remaining construction is the same as in the case of FIG. 7.

The speaker 111 converts a sound signal output from the AV decoder 14 into sound. Also, the CRT monitor 112 displays and outputs image signals output from the AV decoder 14.

Next, the above embodiment is briefly described.

For example, the sequence of packets output from the CI-Module 2-1 are received by the digital interface 12-2 of the CI-Post_STB 1b. The digital interface 12-2 receives the sequence of packets sent out from the CI-Module 2-1 and supplies them to the demultiplexer 13.

The demultiplexer 13 separates a plurality of information contained in the data stream output from the digital interface 12-2 and supplies it to the AV decoder 14. The AV decoder 14 decodes the information separated by the demultiplexer 13, and outputs the sound signals to the speaker 111 and outputs the image signals to the CRT monitor 112.

As a result, the image is displayed on the CRT monitor 112, and the corresponding sound is output from the speaker 111.

According to such an embodiment, the CI-Post_STB 1b, and the speaker 111 and the CRT monitor 112 can be formed into one unit.

Figure 9:
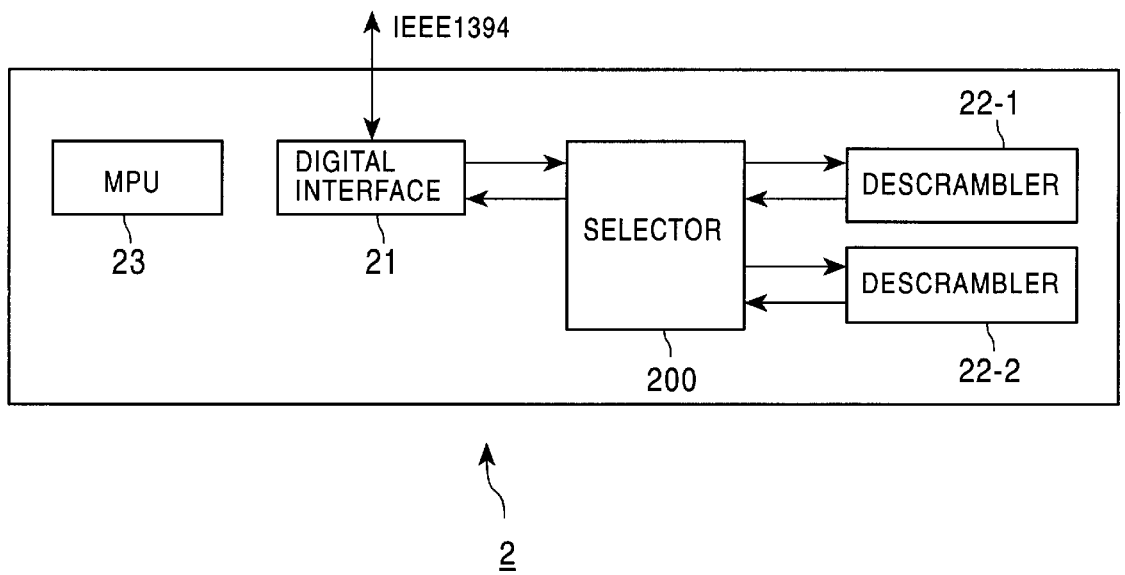
FIG. 9 is a block diagram showing another example of the construction of the CI-Module 2 shown in FIG. 1.

Next, referring to FIG. 9, another example of the construction of the CI-Module 2 is described.

FIG. 9 is a block diagram showing another example of the construction of the CI-Module 2 shown in FIG. 1. Components in FIG. 9 which correspond to those of FIG. 3 are given the same reference numeral, and accordingly, a description thereof has been omitted. In this embodiment, a selector 200 is newly added, and also, the descrambler 22 is increased in number to two descramblers 22-1 and 22-2. The remaining construction is the same as in the case shown in FIG. 3.

The selector 200 supplies the data stream output from the digital interface 21 to either the descrambler 22-1 or the descrambler 22-2, selects either of the data streams output from the descrambler 22-1 and the descrambler 22-2, and supplies it to the digital interface 21.

The descrambler 22-1 and the descrambler 22-2 perform, for example, a descrambling process corresponding to the broadcasting provider A and the broadcasting provider B. respectively.

Next, the operation of the above embodiment is described.

For example, it is assumed that the descrambler 22-1 corresponds to the broadcasting provider A, and the descrambler 22-2 corresponds to the broadcasting provider B. In such a case, in the case where, for example, a broadcast from the broadcasting provider B is received, the MPU 23 controls the selector 200 so that it selects the descrambler 22-2.

Then, when the data stream corresponding to the broadcasting provider B is output from the CI-STB 1-1, the digital interface 21 receives the data stream and outputs it to the selector 200. Since the selector 200 is connected to the descrambler 22-2 as described above, the data stream is subjected to a descrambling process by the descrambler 22-2, and then supplied to the digital interface 21 again through the selector 200.

The data stream output from the digital interface 21 is reproduced by the CI-STB 1-1.

In the case where a broadcast corresponding to the broadcasting provider A is received, the selector 200 selects the descrambler 22-1.

According to the above embodiment, since the CI-Module 2 includes the descramblers 22-1 and 22-1 corresponding to different broadcasting providers, and the selector 200, so that a desired descrambler is selected by the selector 200 in such a manner as to correspond to the broadcasting provider of a broadcast to be received, it is possible for one CI-Module 2 to receive broadcasts of a plurality of broadcasting providers.

Figure 10:
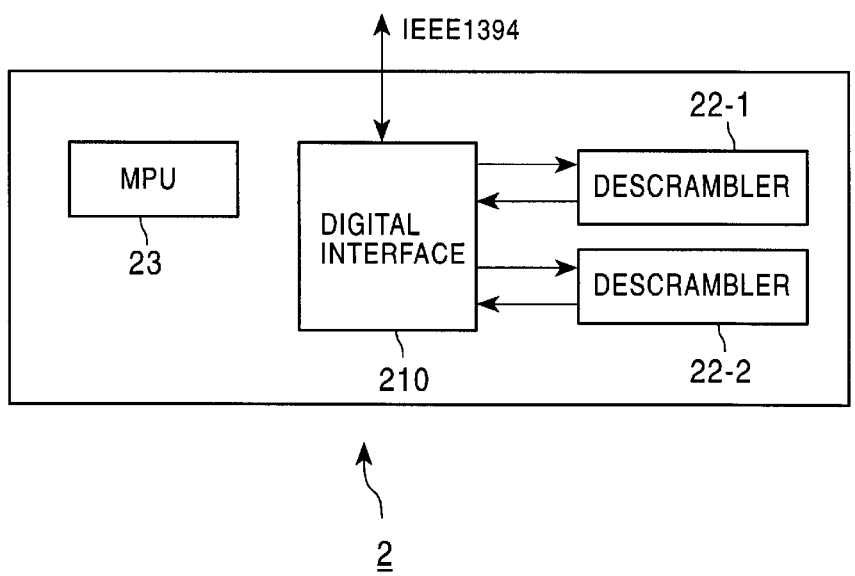
FIG. 10 is a block diagram showing still another example of the construction of the CI-Module 2 shown in FIG. 1.

Next, referring to FIG. 10, another example of the construction of the CI-Module 2 is described.

FIG. 10 is a block diagram showing another example of the construction of the CI-Module 2 shown in FIG. 1. Components in FIG. 10 which correspond to those of FIG. 9 are given the same reference numeral, and accordingly, a description thereof has been omitted. In this embodiment, in comparison with the case of FIG. 9, the selector 200 has been omitted, and also, the digital interface 21 has been replaced with a digital interface 210. The remaining construction is the same as in the case shown in FIG. 9.

Next, the operation of the above embodiment is briefly described.

In the embodiment shown in FIG. 10, it is possible for the descrambler 22-1 and the descrambler 22-2 to perform a descrambling process simultaneously on the data streams from two types of broadcasting providers. Therefore, in the case of FIG. 10, it is possible to receive broadcasts from two broadcasting providers at the same time.

Next, the above embodiment is briefly described.

For example, it is assumed that the descrambler 22-1 corresponds to the broadcasting provider A, and the descrambler 22-2 corresponds to the broadcasting provider B.

Then, when the data stream corresponding to each of the broadcasting providers A and B is output from the CI-STB 1-1 and the CI-STB 1-2, respectively, the digital interface 210 receives these data streams and supplies them to the descramblers 22-1 and 22-2, respectively. As a result, the data streams are subjected to the descrambling process by the descramblers 22-1 and 22-2 and then are sent out through the digital interface 210.

The data streams corresponding to the broadcasting provider A and the broadcasting provider B output from the digital interface 210 are reproduced simultaneously by the CI-STB 1-1 and the CI-STB 1-2, respectively.

According to the above embodiment, it is possible for one apparatus to reproduce a plurality of broadcasts at the same time.

Figure 11:
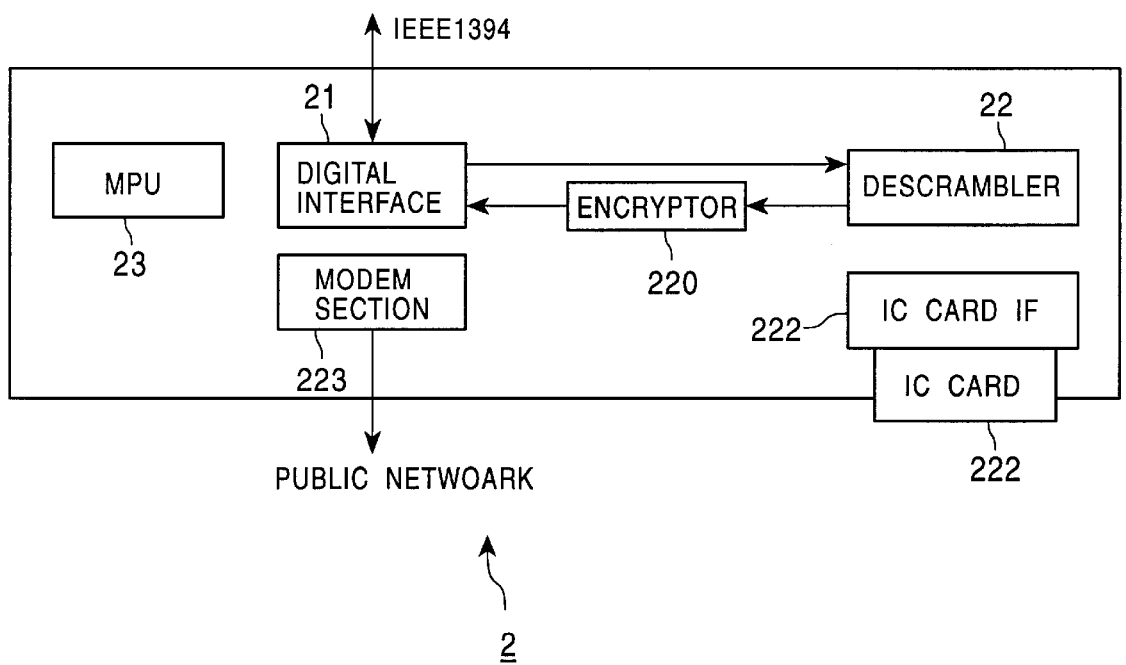
FIG. 11 is a block diagram showing yet still another example of the construction of the CI-Module 2 shown in FIG. 1.

FIG. 11 is a view showing another example of the construction of the CI-Module 2 shown in FIG. 1. Components in FIG. 11 which correspond to those of FIG. 3 are given the same reference numeral, and accordingly, a description thereof has been omitted. In the embodiment of FIG. 11, in comparison with the case of FIG. 3, an encryptor 220, an IC card IF 221, an IC card 222, and a modem section 223 are newly added. The remaining construction is the same as in the case of FIG. 3.

The encryptor 220 encrypts a data stream output from the descrambler 22.

The IC (Integrated Circuit) card IF (Interface) 221 writes predetermined information into the IC card 222 and reads predetermined information stored in the IC card 222. The IC card 222 can be inserted into and removed from the IC card IF 221.

The modem section 223 is connected to the broadcasting provider side through a public network so that information, such as accounting information, can be exchanged with the provider.

Figure 12:
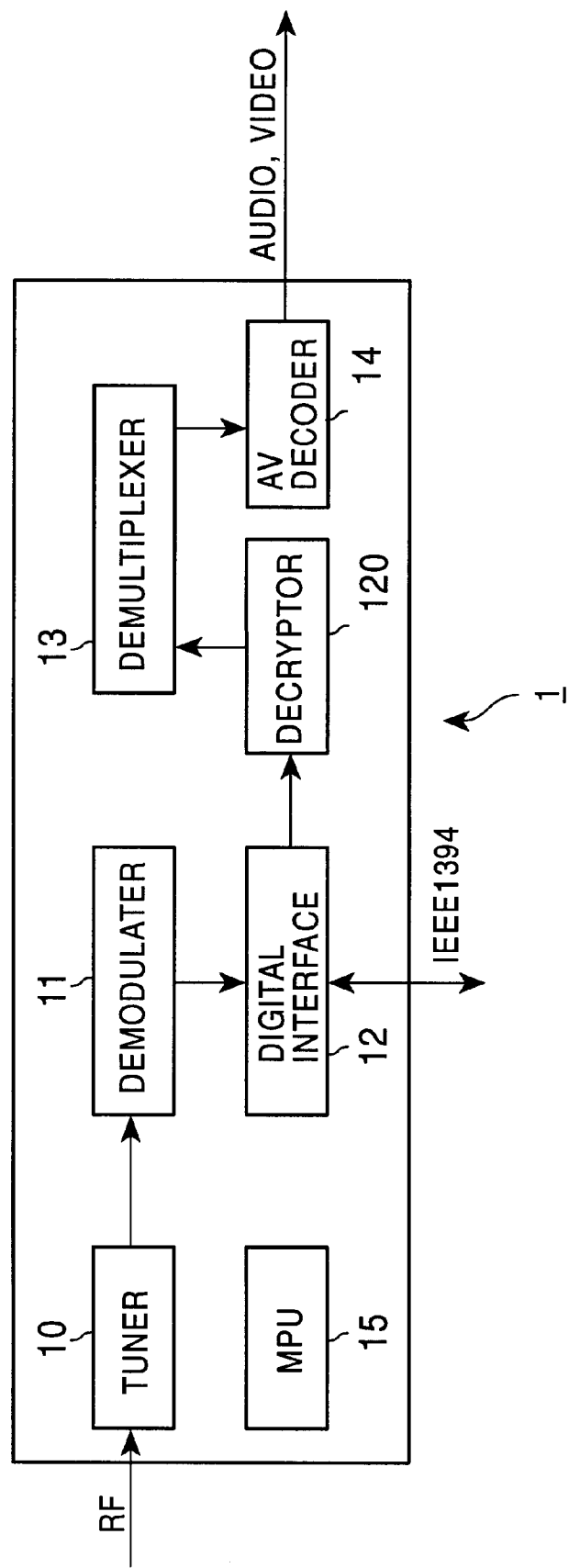
FIG. 12 is a block diagram showing another example of the construction of the CI-STB 1 shown in FIG. 1.

FIG. 12 is a block diagram showing an example of the construction of the CI-STB 1 corresponding to the CI-Module 2 of FIG. 11. Components in FIG. 12 which correspond to those of FIG. 2 are given the same reference numeral, and accordingly, a description thereof has been omitted.

In the embodiment shown in FIG. 12, in comparison with the case of FIG. 2, a decryptor 120 is newly added. The remaining construction is the same as in the case of FIG. 2.

The decryptor 120 decodes the data stream encrypted by the encryptor 220 of FIG. 11 into the original data stream.

Therefore, the data stream output from the CI-Module 2 shown in FIG. 11 cannot be reproduced if the CI-STB 1 shown in FIG. 12 is not used. Therefore, according to such a technique as above, only the duly authorized apparatus can reproduce information.

Figure 13:
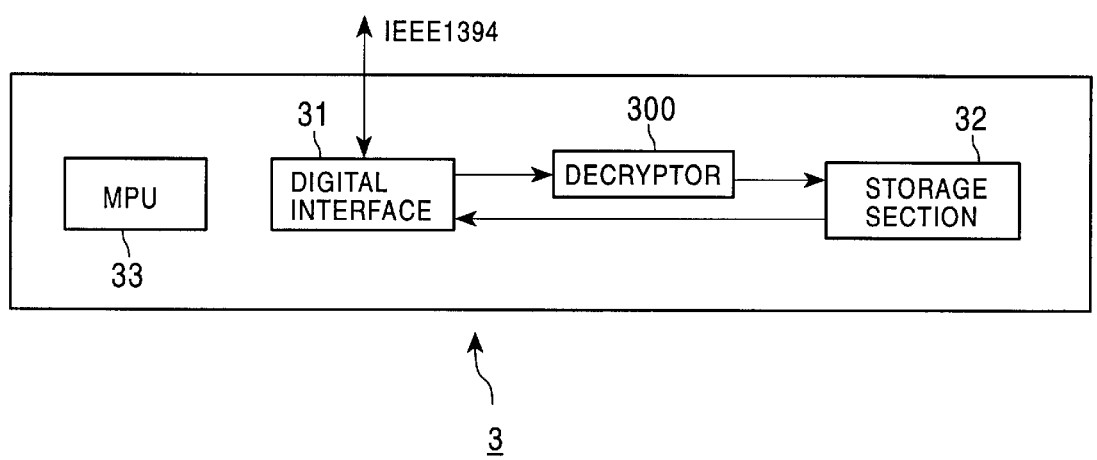
FIG. 13 is a block diagram showing another example of the construction of the CI-Storage 3 shown in FIG. 1.

FIG. 13 is a block diagram showing an example of the construction of the CI-Storage 3 corresponding to the CI-Module 2 of FIG. 11. Components in FIG. 13 which correspond to those of FIG. 4 are given the same reference numeral, and accordingly, a description thereof has been omitted.

In this embodiment, a decryptor 300 is newly added. The remaining construction is the same as in the case of FIG. 4.

According to such a construction, since it is possible to decode the data stream encrypted by the encryptor 220 of the CI-Module 2 of FIG. 11 and to store the decoded data stream in the storage section 32, only the duly authorized CI-Storage 3 can store the data stream.

There is a case in which for the protection of the copyright of information transmitted through the IEEE1394 interface, an encryption function and a decoding function are provided within the digital interface. In that case, there is no need to provide the above-described encryptor 220 and decryptors 120 and 300.

Figure 14:
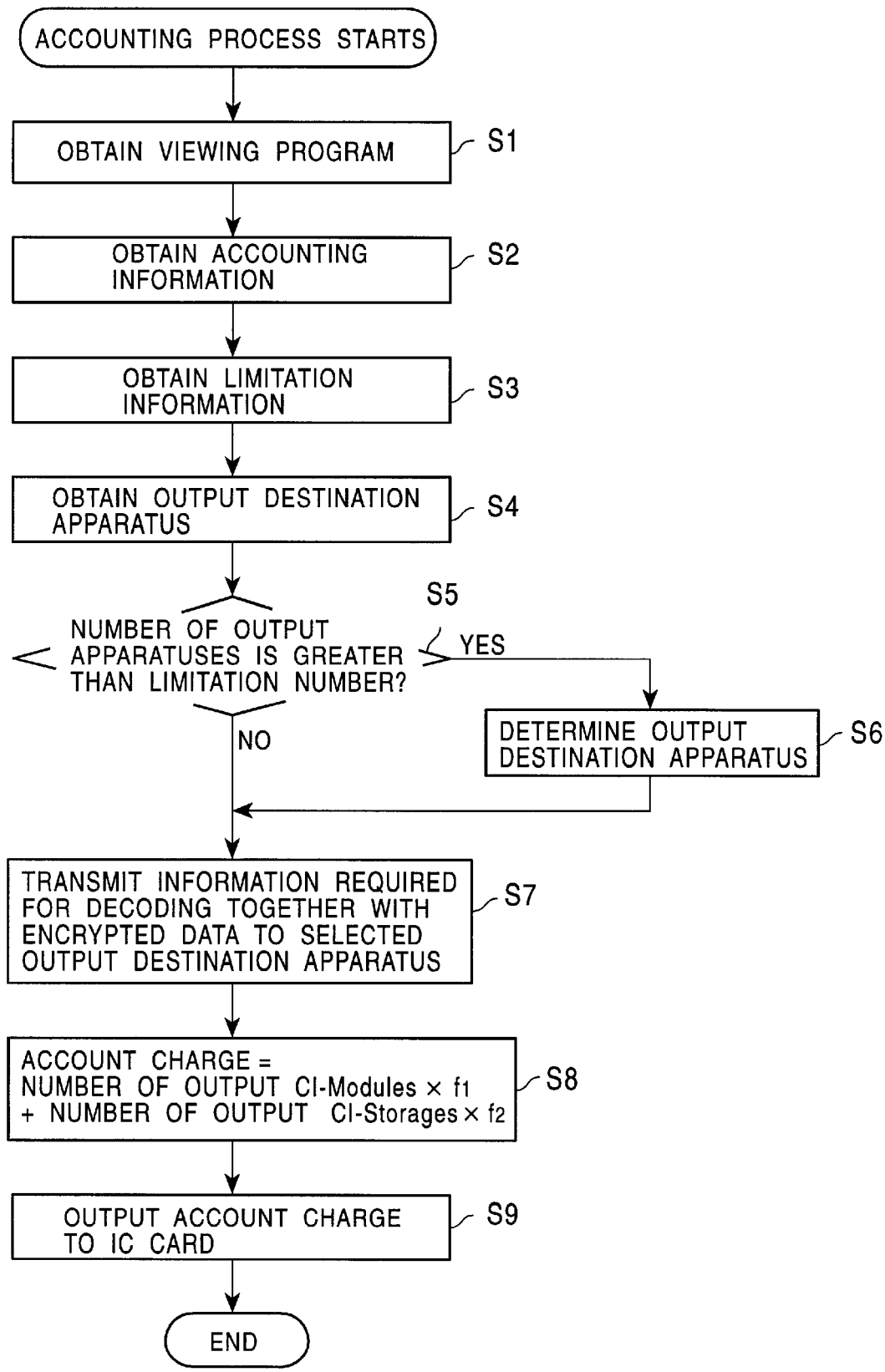
FIG. 14 is a flowchart illustrating an example of the process performed by the CI-Module 2 shown in FIG. 11.

Next, referring to FIG. 14, the operation of the above embodiment is described.

FIG. 14 is a flowchart illustrating an example of the process performed in the embodiment of FIGS. 11 to 13. When this process is performed, in step SI, the MPU 23 obtains a viewing program. More specifically, when the system is powered on and a desired program is selected by the user, the MPU 23 obtains a packet which is contained in the data stream output from the digital interface 21 and which contains information for the selected program.

In the subsequent step S2, the accounting information is obtained. More specifically, the MPU 23 obtains the accounting information of the program which is viewed currently by referring to the packet containing the accounting information from among the packets obtained in step S1. The process then proceeds to step S3.

In step S3, limitation information is obtained. More specifically, the MPU 23 obtains information, such as the limitation number of the output apparatuses, by referring to the limitation information in the packet containing the accounting information referred to in step S2.

In step S4, the MPU 23 detects the number of apparatuses as the objects of output of data stream output from the descrambler 22 and compares it with the limitation information obtained in step S3, thereby determining whether or not the number of output apparatuses is greater than the limitation number (step 5). When the result shows that the number of output apparatuses is greater (YES) than the limitation number, the output apparatuses corresponding to the limitation number from among the output apparatuses as the objects of output are determined (step 6). For example, the output apparatus selected earlier is given priority in the sequence in which the user specified as an output apparatus. The data encrypted by the encryptor 220 is transmitted to only output apparatuses within the limitation number, selected in this manner, in isochronous communication, and information for decoding the encrypted data is transmitted in asynchronous communication of IEEE1394 (step 7).

Limitation of the number of apparatuses as the objects of output may be performed for each type of apparatus, for example, in such a manner that N is a limitation number for model A and M is a limitation number for model B.

As a result of the comparison in step S5, when it is determined that the number of output apparatuses is smaller (NO) than the limitation number, the process proceeds to step S7 where the data encrypted by the encryptor 220 is transmitted in the isochronous communication to only the selected output apparatuses within the limitation number, and information for decoding the encrypted data is trans-mitted in the asynchronous communication of IEEE1394 (step 7). In the subsequent step S8, the MPU 23 computes the account charge. More specifically, the MPU 23 computes the sum of the product of the number of CI-Modules 2 which are the output destinations at present and the account charge $f_1$ per CI-Module 2, and the product of the number of CI-Storages 3 which are the output destinations and the account charge $f_2$ per CI-Storage 3. The computed value is supplied as the account charge to the IC card 222 in which it is stored therein in step S9. Then, the process is terminated (END).

According to the above process, the number of apparatuses for the objects of output can be smaller than the limitation number, and accounting can be performed according to the type of output apparatus and the number thereof. Therefore, on the broadcasting provider side, it is possible to limit, as required, the use of an apparatus on the user side. Furthermore, for example, by setting the account charge $f_2$ in the case where the information is stored in the CI-Storage 3 higher than the account charge $f_2$ in the case where information is viewed by the CI-Module 2, it is possible to perform accounting which is appropriate to the use of the information and to the number of output apparatuses.

As a result of a process such as the above, the account charge stored in the IC card 222 can be transmitted to the broadcasting provider side through the modem section 223, for example, at an incidence of once per day, and the account charge of each user can be computed.

Furthermore, according to the above embodiment, it is also possible to limit the number of apparatuses for the objects of output.

In the modem section 223 and the IC card 222 which constitute the CI-Module 2 shown in FIG. 11, there are often cases in which the specifications differ from one broadcasting provider to another, the viewing history is stored in different data formats, or the method of payment of the account charge is different. However, in a case where the same function block can be used among different broadcasting providers, a certain function block of the CI-Module 2 is, for example, formed as an independent block so that it can be used by another CI-Module 2, thereby making it possible to simplify the construction of the CI-Module 2.

Figure 15:
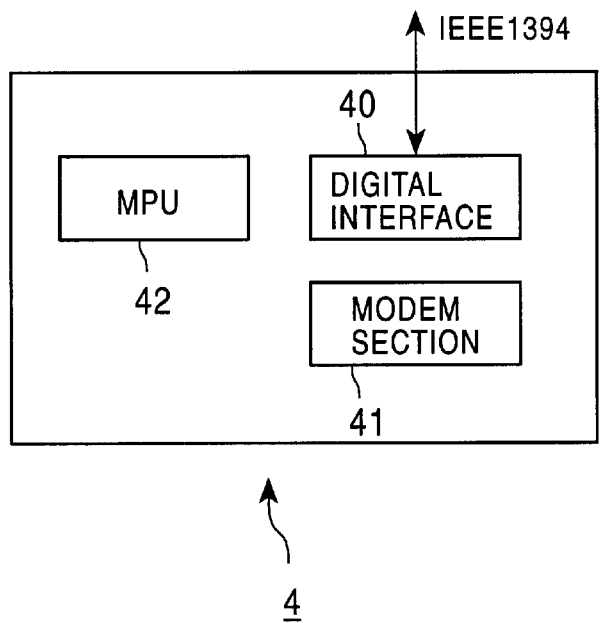
FIG. 15 is a block diagram showing a detailed example of the construction of a CI-Modem 4.
Figure 16:
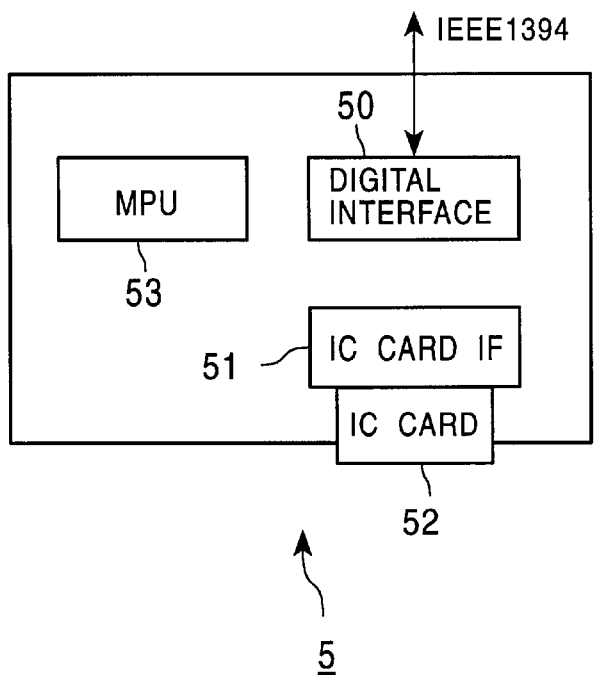
FIG. 16 is a block diagram showing a detailed example of the construction of a CI-Card 5.

FIGS. 15 and 16 show block diagrams of a case in which a function block which can be shared among different broadcasting providers is formed as an independent block.

FIG. 15 shows an example of the construction of a CI-Modem 4 in which only a modem section 41 is an independent block. This embodiment comprises a digital interface 40, a modem section 41, and an MPU 42.

FIG. 16 shows an example of the construction of a CI-Card 5 in which only the IC card is formed as an independent block. This embodiment comprises a digital interface 50, an IC card IF 51, an IC card 52, and an MPU 53.

Each block of the above embodiment is the same as in the above-described case, and accordingly, a description thereof has been omitted.

In the manner described above, since a function block which can be shared among a plurality of broadcasting providers is an independent component, it is possible to reduce the cost of the apparatus by an amount corresponding to the shared function blocks.

In digital broadcasts, there are not a few cases in which a charge must be paid per program (for example, Pay__Per__ View). By performing a predetermined limitation on such a program, for example, it is possible to prevent a child from freely viewing a pay program. Next, a description is given of an example of the construction of the CI-Post_STB 1b which makes such a limitation possible.

Figure 17:
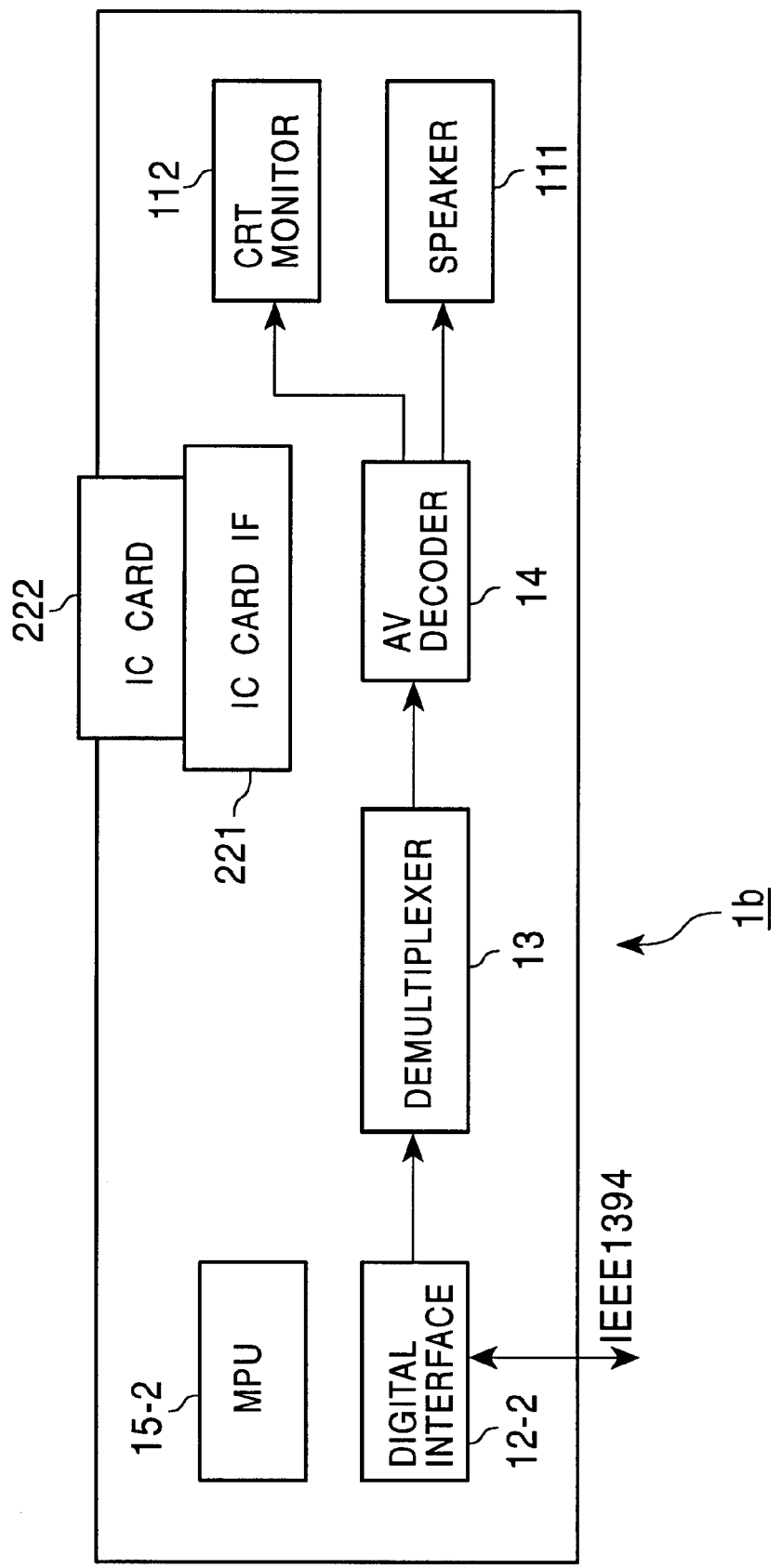
FIG. 17 is a block diagram showing another example of the construction of the CI-Post_STB 1b.

FIG. 17 is a view showing an example of the construction of the CI-Post_STB 1b. Components in FIG. 17 which correspond to those of FIG. 7 are given the same reference numeral, and accordingly, a description thereof has been omitted. In this embodiment, in comparison with the case of FIG. 7, an IC card IF 221, an IC card 222, a speaker 111, and a CRT monitor 112 are newly added. Each block is the same as in the above-described case, and accordingly, a description thereof has been omitted.

Figure 18:
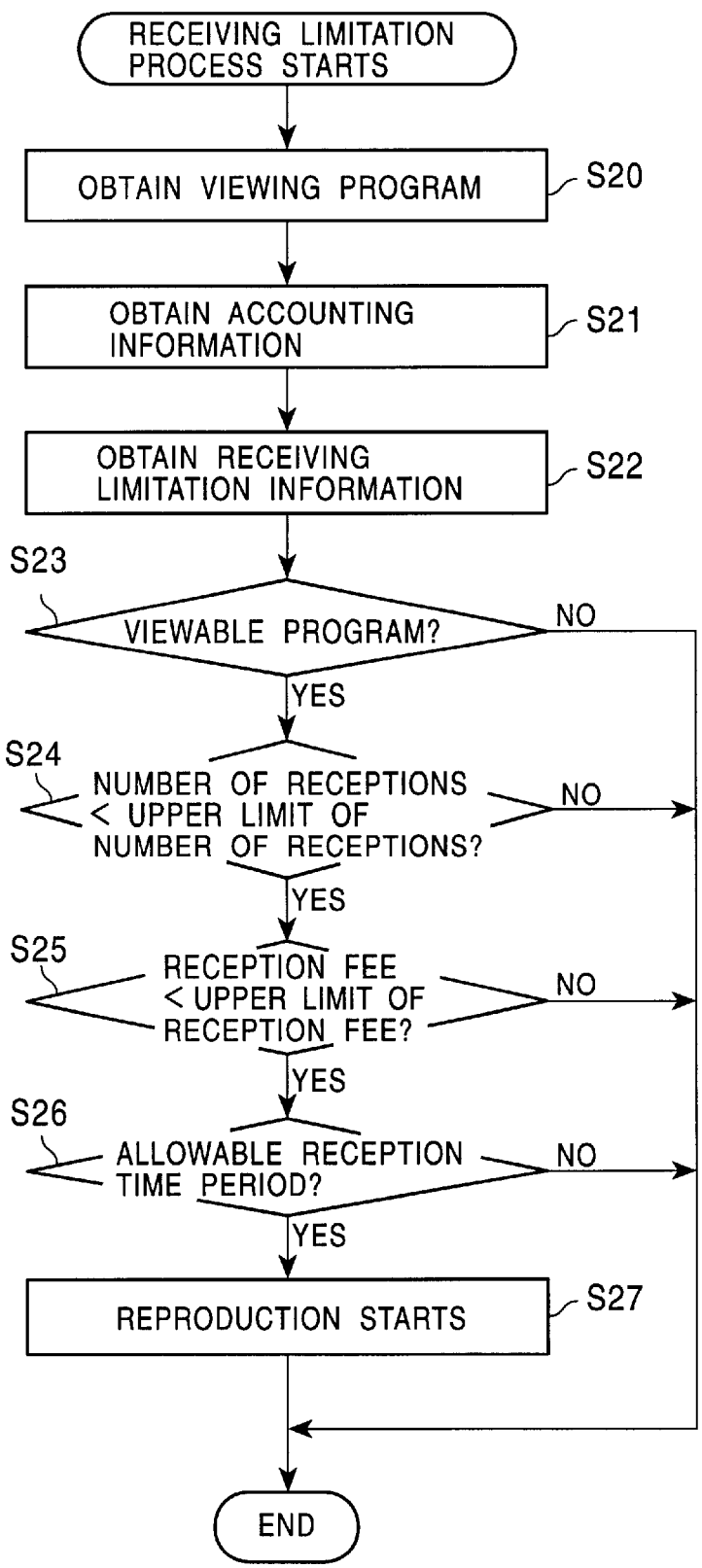
FIG. 18 is a flowchart illustrating an example of a process performed in the embodiment of FIG. 17.

Next, referring to FIG. 18, the operation of the above embodiment is described.

FIG. 18 is a flowchart illustrating an example of a process performed in the embodiment shown in FIG. 17.

When this process is performed, in step S20, the MPU 15-2 obtains a viewing program. More specifically, when the system is powered on and a desired program is selected by the user, the MPU 15-2 obtains a packet which is contained in the data stream output from the digital interface 12-2 and which contains information for the selected program.

In the subsequent step S21, accounting information is obtained. More specifically, the MPU 15-2 obtains the accounting information of the program which is viewed currently by referring to the packet containing accounting information from among the packets obtained in step S20. The process then proceeds to step S22.

In step S22, reception limitation information is obtained. More specifically, the MPU 15-2 obtains the reception limitation information from the IC card 222 through the IC card IF 221.

In step S23, the MPU 15-2 determines whether or not the program to be viewed can be viewed. More specifically, the MPU 15-2 refers to the reception limitation information obtained in step S22 in order to determine whether or not the program which is viewed currently is a program in which, for example, a child lock is applied. When the result shows that the program to be viewed is such that a child lock is applied (NO: a program which cannot be viewed), the process is terminated (END). Also, when it is determined that a child lock is not applied (YES: a program which can be viewed), the process proceeds to step S24.

In step S24, the MPU 15-2 reads the viewing history from the IC card 222, computes a total number of program viewing up to the present time, and compares the total number of program viewing with the upper limit of number of receptions contained in the reception limitation information obtained in step S22 in order to determine whether or not the number of program viewing is smaller than the upper limit of the number of receptions. When the result shows that the number of program viewing is greater than the upper limit of the number of receptions (NO), the process is terminated (END). Also, when it is determined that the number of receptions is not greater than the upper limit of the number of receptions (YES), the process proceeds to step S25.

In step S25, the MPU 15-2 reads the viewing history from the IC card 222, computes the total program reception fee up to the present time, and compares the total program reception fee with the upper limit of the reception fee contained in the reception limitation information obtained in step S22 in order to determine whether or not the program reception fee is smaller than the upper limit of the reception fee. When the result shows that the program reception fee is greater than the upper limit of the reception fee (NO), the process is terminated (END). Also, when it is determined that the reception fee is not greater than the upper limit of the reception fee (YES), the process proceeds to step S26.

In step S26, the MPU 15-2 reads the present time from a timer section (not shown), and compares the time with the allowable reception time period contained in the reception limitation information obtained in step S22 in order to determine whether or not the present time is included in the allowable reception time period. When the result shows that the present time is not within the allowable reception time period (NO), the process is terminated (END). Also, when it is determined that the present time is in the allowable reception time period (YES), the process proceeds to step S27.

In step S27, the reproduction of the broadcasting program is started.

According to a process such as the above, in the case where a child lock is applied to the program to be viewed, this lock can be detected to limit the viewing. Not only in a case in which the total number of receptions of programs is greater than the upper limit of the number of receptions preset by a user, but also in a case in which the total reception fee is greater than the upper limit of the reception fee preset by a user, it is possible to limit viewing. Furthermore, in order to prevent a child from viewing a late-night program, also when the present time is not included in the allowable reception time period, viewing can be limited.

Although in the above embodiment the tuner 10 is handled as a common part irrespective of the broadcasting providers, in a case in which, for example, transmission configurations (for example, a satellite broadcast, a ground-wave program, or a cable broadcast) from broadcasting providers are different, this tuner section 10 cannot be handled as a common part. In such a case, as shown in FIG. 19, it is preferable that the tuner 10 be included in the CI-Module 2.

Figure 19:
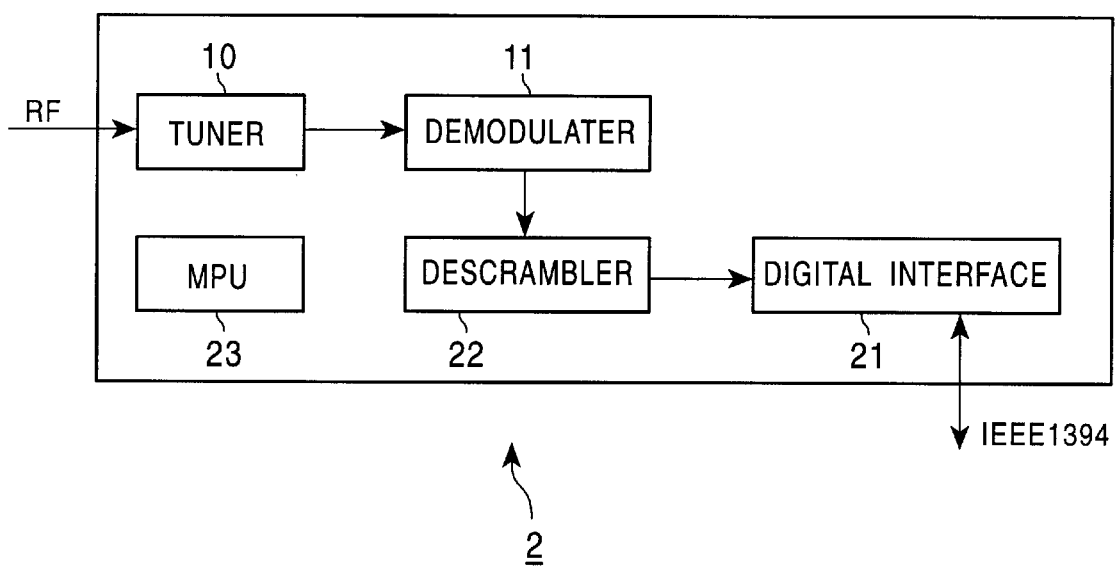
FIG. 19 is a block diagram showing another example of the construction of the CI-Module 2 shown in FIG. 1.

FIG. 19 is a block diagram showing an example of the construction of the CI-Module 2 corresponding to the above-described case. Components in FIG. 19 which correspond to those of FIG. 3 are given the same reference numeral, and accordingly, a description thereof has been omitted.

In the embodiment of FIG. 19, in comparison with the case of FIG. 3, the tuner 10 and the demodulator 11 are newly added. The remaining construction is the same as in the case of FIG. 3.

Since the tuner 10 and the demodulator 11 are described earlier, a description thereof has been omitted.

Next, the operation of the above embodiment is described.

The RF signal of a predetermined frequency extracted by the tuner 10 is demodulated by the demodulator 11 and output in the form of a data stream. The descrambler 22 performs a descrambling process on the data stream obtained as a result of demodulation and outputs the obtained data stream through the digital interface 21.

The data stream output through the digital interface 21 is input, for example, to the CI-Post_STB 1b shown in FIG. 7, whereby a reproduction process is performed, and the image signals and the sound signals are output.

According to the above embodiment, when the tuner 10 is different depending on the broadcasting provider, the function blocks can be shared, and accordingly, the cost of the apparatus can be reduced.

Finally, although in the above embodiment a CI-STB and a CI-Module are used in combination in order to receive a broadcast, in a case in which reception is possible even if processing is not performed by the CI-Module, it is preferable that processing be performed by only the CI-STB.

For example, in the case where the CI-STB takes the form shown in FIG. 2, when an external apparatus connected to the IEEE1394 bus does not require a data stream of a broadcast, the digital interface 12 may output the output of the demodulator 11 directly to the demultiplexer 13 without outputting it to the outside. According to such a method, the amount of information transmitted on the IEEE1394 bus can be reduced, thereby allowing exchange of information to be smoothly performed among the other apparatuses.

In this specification, the examples of the transmission medium include not only information recording media, such as FDs (floppy disks) or CD-ROMs (compact disc-read-only memories), but also network transmission media, such as the Internet or a digital satellite.

According to the information processing apparatus, the information processing method transmission medium, and the transmission medium of the present invention, broadcasting signals are received, the signal of a predetermined channel is selected from the received broadcasting signals, the selected signal of the predetermined channel is demodulated into a data stream composed of a plurality of information, and the demodulated data stream is output to an external apparatus through an interface. Therefore, when broadcasts from a plurality of broadcasting providers are received, it is possible to reduce the cost of the apparatus by an amount corresponding to the common function blocks.

According to the information processing apparatus, the information processing method, and the transmission medium of the present invention, a data stream processed by an external apparatus is input through an interface, a plurality of information contained in the input data stream is separated, each of the plurality of separated information is decoded, and the plurality of decoded information is output to a corresponding reproduction apparatus. Therefore, when broadcasts from a plurality of broadcasting providers are received, it is possible to reduce the cost of the apparatus by an amount corresponding to the common function blocks.

According to the information processing apparatus, the information processing method, and the transmission medium of the present invention, a data stream processed by an external apparatus is input through an interface, the input data stream is descrambled, and the descrambled data stream is output to an external apparatus through an interface. Therefore, it is possible for the same apparatus to receive broadcasts from a plurality of broadcasting providers.

According to the information processing apparatus, the information processing method, and the transmission medium of the present invention, a data stream on which a predetermined process is performed by an external apparatus and which is then encrypted is input through an interface, the input encrypted data stream is decoded, and the decoded data stream is stored. Therefore, it is possible to prevent unauthorized copying of information into a storage apparatus which is not duly authorized by the broadcasting provider side.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A broadcast signal receiving system, comprising:
   (a) a receiver for receiving a scrambled broadcast signal;
   (b) a demodulator for demodulating said received scrambled broadcast signal;
   (c) a first interface for outputting said demodulated scrambled broadcast signal; and
   (d) a module attachable to said receiver comprising
      (i) a descrambler and
      (ii) a second interface in communication with said first interface for inputting said demodulated scrambled broadcast signal and for outputting a descrambled broadcast signal to said first interface.

2. The broadcast signal receiving system according to claim 1, wherein said descrambling module further comprises an encryptor for encrypting said descrambled broadcast signal and for outputting the encrypted descrambled broadcast signal to said first interface, and said system further comprises a decryptor for decrypting said encrypted descrambled broadcast signal received from said descrambling module through said first and second interfaces.

3. A broadcast signal receiver, comprising:
   (a) a tuner for receiving a scrambled broadcast signal;
   (b) a demodulator for demodulating said received scrambled broadcast signal; and
   (c) an interface for outputting said demodulated scrambled broadcast signal to a descrambling module attachable to said receiver and for inputting a descrambled broadcast signal from said descrambling module.

4. The broadcast signal receiver according to the claim 3, wherein said interface is further configured to input an encrypted descrambled broadcast signal from said descrambling module, and said receiver further comprises a decryptor for decrypting said encrypted descrambled broadcast signal received from said descrambling module.

5. A descrambling module attachable to a broadcast signal receiver, comprising:
   (a) an interface for inputting a scrambled broadcast signal from said broadcast signal receiver; and
   (b) a descrambler for descrambling said inputted scrambled broadcast signal and outputting the descrambled broadcast signal to said broadcast signal receiver through said interface.

6. The descrambling module according to claim 5, further comprising an encryptor for encrypting said descrambled broadcast signal and for outputting the encrypted descrambled broadcast signal to said broadcast receiver through said interface.

7. A method of descrambling broadcast signals comprising:
   (a) receiving a scrambled broadcast signal by a receiver;
   (b) demodulating said received scrambled broadcast signal;
   (c) outputting said demodulated scrambled broadcast signal to a descrambling module attachable to said receiver;
   (d) descrambling said scrambled broadcast signal by said module; and
   (e) outputting the said descrambled broadcast signal to said receiver.

8. The method according to claim 7, further comprising encrypting said descrambled broadcast signal in said module prior to outputting said descrambled broadcast signal and decrypting said encrypted descrambled broadcast signal received in said receiver.

9. A broadcast signal receiving system, comprising:
- a receiver for receiving a scrambled broadcast signal;
- a demodulator for demodulating said received scrambled broadcast signal;
- a first interface for outputting said demodulated scrambled broadcast signal; and
- a module attachable to said first interface comprising a descrambler and
- a second interface in communication with said first interface for inputting said demodulated scrambled broadcast signal and for outputting a descrambled broadcast signal to said first interface.

10. The broadcast signal receiving system according to claim 1, wherein said descrambling module further comprises an encryptor for encrypting said descrambled broadcast signal and for outputting the encrypted descrambled broadcast signal to said first interface through said second interface, and said system further comprises a decryptor for decrypting said encrypted descrambled broadcast signal received from said descrambling module through said first and second interfaces.

* * * * *

UNITED STATES PATENT AND TRADEMARK OFFICE
CERTIFICATE OF CORRECTION

PATENT NO.      : 6,438,693 B1
DATED           : August 20, 2002
INVENTOR(S)     : Takehiko Nakano It is certified that error appears in the above-identified patent and that said Letters Patent is hereby corrected as shown below:

<u>Title page, Item [54] and Column 1, line 2,</u>
Title, "MEMO" should read -- METHOD --.

<u>Column 12,</u>
Line 20, "$f_2$" should read -- $f_1$ --.

Signed and Sealed this

Twenty-ninth Day of April, 2003

JAMES E. ROGAN
*Director of the United States Patent and Trademark Office*